United States Patent [19]

Mottier et al.

[11] Patent Number: 5,049,772

[45] Date of Patent: Sep. 17, 1991

[54] REDUCED NOISE COMMUTATOR

[75] Inventors: François M. Mottier, West Hartford; George R. Wisner, Deep River, both of Conn.

[73] Assignee: United Technologies Corporation, Hartford, Conn.

[21] Appl. No.: 580,224

[22] Filed: Sep. 10, 1990

[51] Int. Cl.[5] .............................................. H02K 13/00

[52] U.S. Cl. .................................... 310/233; 310/240; 310/242; 310/220; 310/51

[58] Field of Search ............... 310/233, 248, 231, 236, 310/237, 234, 235, 240, 241, 242, 245, 220, 221, 222, 51, 42

[56] References Cited

U.S. PATENT DOCUMENTS 1,861,059 5/1932 Johnson .............................. 310/211
3,876,892 4/1975 Noodleman ........................... 310/46

FOREIGN PATENT DOCUMENTS 63191 8/1926 Fed. Rep. of Germany ...... 310/245

*Primary Examiner*—Steven L. Stephan
*Assistant Examiner*—Edward H. To
*Attorney, Agent, or Firm*—Peter R. Ruzek

[57] ABSTRACT

A commutator arrangement includes a commutator member rotatably mounted on a support and including a plurality of circumferentially adjacent contact pads that are mechanically connected with one another and electrically separated from each other by respective intervening gaps, and a number of commutator brushes that are mounted on the support for only substantially radial movements toward and away from the commutator member and are biased toward the latter to establish contact between their respective contact surfaces and those of the pads. The lateral edges bounding one kind of these contact surfaces circumferentially deviate from those delimiting the other contact surface kind over at least a part of their courses such that different portions of such lateral edges are juxtaposed with their counterparts at different times during the relative rotation of the commutator member.

15 Claims, 1 Drawing Sheet

REDUCED NOISE COMMUTATOR

TECHNICAL FIELD

The present invention relates to electric motors and generators in general, and more particularly to commutator arrangements for use therein.

BACKGROUND ART

There are already known various constructions of electric motors and generators (collectively referred to herein as electric power devices), among them such employing commutator arrangements for either supplying electric current to, or withdrawing electric current from, a plurality of windings that are mounted on a rotor of the electric power device for rotation therewith. A commutator arrangement of the above type typically includes a commutator ring which is usually mounted on the rotor of the electric power device for rotation therewith, and a plurality of so-called commutator brushes which are usually mounted on the stator of the electric power device and are in electrically transmissive contact with the commutator ring. The commutator brushes are mounted on the stator for movement in the respective radial directions and are biased toward the commutator ring to assure as good an electric contact therewith as possible without unduly interfering with the rotation of the rotor. The commutator ring includes a plurality of circumferentially adjacent contact pads which are individually electrically connected with the respective associated windings of the rotor and are electrically separated from one another by respective gaps which are usually at least partially filled with a solid dielectric material.

The circumferential extent of each of the brushes is usually greater than that of any of the gaps, so that the respective commutator brush is in contact with either a single one, or two circumferentially adjacent ones, of the contact pads of the commutator ring, thus electrically bridging the intervening gap in the latter instance. To avoid excessive sparking and/or electric power loss, the contact pads of the commutator ring are associated (electrically connected) with their respective windings in such a manner that the electrical potentials to be supplied to (if the electric power device is a motor, to power the same), or appearing at (if the electric power device is a generator), any two circumferentially adjacent ones of the contact pads are only insignificantly different from one another during such bridging.

It will be appreciated from the above that the presence of the electrically insulating gaps on the commutator ring, and the movable mounting and biasing of the brushes, are essential for the operation of the commutator arrangement. However, experience has shown that the combination of these features results in the generation of objectionable high-pitch or whining noises, at least in small-size electric motors, during the operation of such devices when they are constructed in accordance with the current practice. When looking for the source of such noises, it was established that they result, at least in part, from the fact that, be it because of manufacturing inaccuracies, or due to wear, or as a result of the very existence of the gaps, the area of the circumferential surface of the commutator ring with which the respective commutator brush is in contact undergoes movements in opposite radial directions as the commutator ring rotates relative to the brush. Now, because the commutator brushes, despite their name, are nowadays usually constituted by solid bodies, the aforementioned radial movements are followed by the brushes, resulting in vibrations and attendant noise.

Moreover, because both the commutator pad edges and the commutator brush edges extend parallel to the axis of rotation in the heretofore known commutator arrangement constructions in order to minimize the duration of the aforementioned electrical bridging, additional movements (and noises) may be induced in the respective brushes as their edges run into or dissociate themselves from the corresponding edges of the respective commutator pads over their entire lengths at the same time. While this particular problem could be minimized if not eliminated altogether by filling the gaps of the commutator ring with the solid dielectric material to such an extent that the affected surfaces of the thus obtained dielectric material separators constitute, at least initially and possibly after machining, smooth continuations of the contiguous contact surfaces of the adjacent commutator pads, even the adoption of this measure still does not eliminate the noises resulting from the commutator brush movements attributable to the radial deviations of the contact surface of the commutator ring from its ideal cylindrical configuration centered on the axis of rotation and, if steps are present between the adjacent edges of the pads, especially those caused by the meeting and dissociation of the brush and pad edges.

Accordingly, it is a general object of the present invention to avoid the disadvantages of the prior art.

More particularly, it is an object of the present invention to provide a commutator arrangement which does not possess the disadvantages of the known arrangements of this kind.

Still another object of the present invention is so to develop the commutator arrangement of the type here under consideration as to minimize if not eliminate noise generated as the commutator brushes ride on the corresponding commutator ring surface.

It is yet another object of the present invention to devise an arrangement of the above type which would maintain the efficiency of the device employing the same at a relatively high level.

A concomitant object of the present invention is to design the commutator arrangement of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in a commutator arrangement which includes a commutator member which is mounted on a support for rotation relative thereto about a rotational axis and includes a plurality of circumferentially adjacent contact pads that are mechanically connected with one another and electrically separated from each other by respective intervening gaps. These pads have radially facing first contact surfaces which are centered on the rotational axis all at substantially the same radius therefrom to cumulatively constitute a circumferential surface of the commutator member. Each of the first contact surfaces is circumferentially delimited by a respective first pair of lateral edges extending along the respective intervening gaps. The commutator arrangement further includes a number of commutator brushes each of which has a second contact surface delimited by a respective second pair of lateral edges. Each of the brushes is mounted on the support for only substantially radial movement relative thereto toward and away from the circumferential surface with the second contact surface facing the circumferential surface and the lateral edges of the second pair extending along those of the first pair. Each of the brushes is biased toward the circumferential surface to establish contact between the first and second contact surfaces. According to the invention, the lateral edges of one of the pairs circumferentially deviate from those of the other of the pairs over at least a part of their courses such that different portions of each of the lateral edges of the second pair are juxtaposed with the corresponding portions of the respective lateral edge of the first pair at different times during the relative rotation of the commutator member.

BRIEF DESCRIPTION OF THE DRAWING

The present invention will be described in more detail below with reference to the accompanying drawing in which.

BEST MODE FOR CARRYING OUT THE INVENTION

Figure 2B:
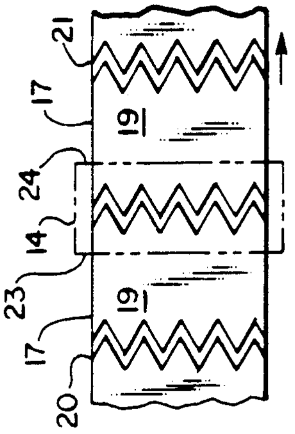
Figure 2D:
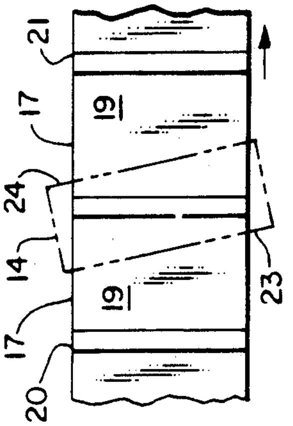
Figure 2A:
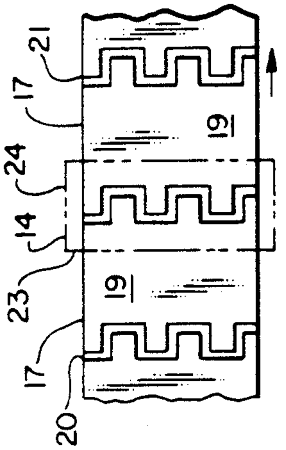
Figure 2C:
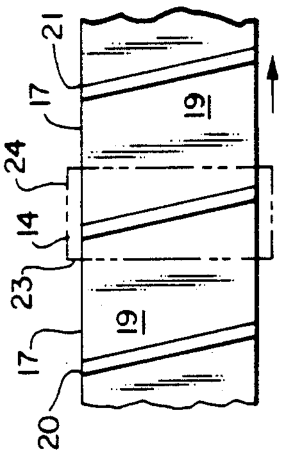
Figure 1:
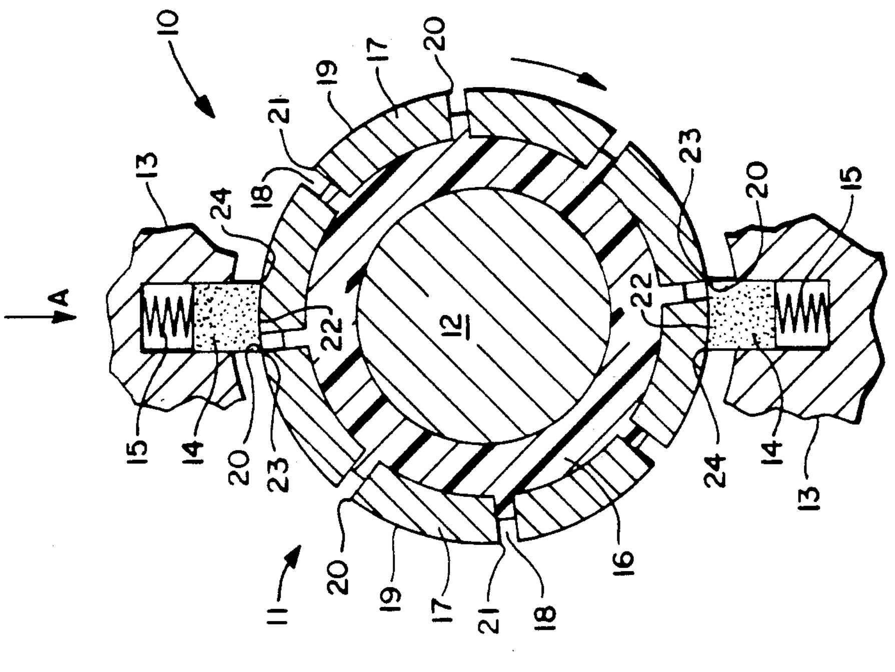
FIG. 1 is a cross-sectional view of a commutator arrangement for use of the features of the present invention therein; and FIGS. *2a* to *2d* are respective simplified lateral elevational views of several examples of the modifications made in the commutator arrangement of FIG. 1 in accordance with the present invention, all taken in the direction of an arrow A in FIG. 1 and with a portion of a commutator member thereof being presented in a developed condition.

Referring now to the drawing in detail, and first to FIG. 1 thereof, it may be seen that the reference numeral 10 has been used therein to identify a commutator arrangement for use in an electric power device of the type mentioned before. As depicted in FIG. 1, the arrangement 10 is of a conventional construction which will be used below as a basis for an explanation of the present invention; however, the basic components present in this construction can also be found in the commutator arrangement construction in accordance with the present invention.

The commutator arrangement 10 includes a commutator member 11 which is shown to be configured as a commutator ring that is mounted on a shaft 12, in any well known manner, for joint rotation therewith about a rotational axis relative to a support 13, and a plurality of (as shown, two) so-called commutator brushes 14. The brushes 14 are mounted on the support 13, at diametrically opposite locations of the shaft 12, for movement relative to the support 13 substantially only radially of the rotational axis of the shaft 12, and are urged or biased, by respective springs 15, toward the commutator member 11.

The commutator member 11 as illustrated includes a hub element or body 16 and a multitude of (as shown, eight) commutator pads 17 that are connected to the hub body 16, in any known manner such as by being embedded therein, so as to be stationary relative thereto. The body 16 is of a dielectric or electrically insulating material. The commutator pads 17 are, as is well known, electrically separated from one another not only by the material of the body 16 but also by respective intervening gaps 18, and are individually electrically connected, in any known manner that has not been illustrated in the drawing so as not to unduly encumber the same, with respective windings or rotor coils which have also been omitted from the drawing. As depicted in FIG. 1 of the drawing, the electrically insulating material of the body 16 penetrates into the gaps 18 to partially fill the same; however, such material could also fill each of such gaps 18 in its entirety.

Each of the pads 17 has a radially outwardly facing first or pad contact surface 19 which is circumferentially delimited by respective lateral edges 20 and 21 of which, for the direction of rotation of the commutator member 11 with respect to the support 13 that is indicated in the drawing by an arrow, the lateral edge 20 is the leading one, and the lateral edge 21 is the trailing one. On the other hand, each of the brushes 14, which is constituted in accordance with the current practice by a solid block of an electrically conductive material, has a second or brush contact surface 22 that is circumferentially delimited by respective lateral edges 23 and 24 of which, for the above direction of rotation, the lateral edge 23 is the leading one, while the lateral edge 24 is the trailing one. The situation would be reversed for the opposite sense of rotation, that is, the lateral edges 21 and 24 would be the leading ones while the lateral edges 20 and 23 would be the trailing ones.

The biasing action of the springs 15 on the associated brushes 14 keeps the respective brush contact surfaces 22 in electrically conductive contact with juxtaposed portions of the respective pad contact surfaces 19 so that, as the shaft 12 rotates, the respective brush contact surface 22 rides over and is in contact with a circumferential surface of the commutator member 11 that is cumulatively constituted by the pad contact surfaces 19. In an ideal situation, this circumferential surface would be perfectly cylindrical, except for being interrupted by the gaps 18, so that the above riding over would not result in any radial movement of the brushes 14 during the rotation of the shaft 12. In reality, however, it is rare indeed, if achievable at all, to provide a commutator arrangement 10 in which this condition would be satisfied throughout the useful life thereof.

It will be appreciated that any and all brush movements have the potential of making the commutator arrangement 10 noisy, that is, to be translated into vibrations at frequencies in the audible range. In many instances, such noisy commutator operation is acceptable; however, there are many instances in which such noisy operation has to be accepted only because of the absence of any other alternatives. Now, it was established that an important reason for the relatively high level of noise generated during the operation of currently available commutator arrangements that are constructed in the manner described so far is that both the lateral edges 20 and 21 of the pads 17 and the lateral edges 23 and 24 of the brushes 14 extend substantially parallel to the rotational axis of the shaft 12 in such current constructions. As a result, when the commutator member 11 reaches, during its rotation in the sense indicated by the arrow, an angular position such as that depicted in FIG. 1 of the drawing, the leading lateral edges 20 and 23 of the pads 17 and brushes 14 in question start touching one another over their entire lengths at the same time. Experience has shown that, especially when the respective leading lateral edge 20 is at an ever so slightly larger radius than that of the first contact surface 19 of the immediately preceding pad 17, this simultaneous touching of the leading lateral edges 20 and 23 over their entire lengths results in significant movement of the affected brush 14 at least in the radially outward direction. Moreover, depending on the particular geometry involved, such simultaneous edge touching may even result in the generation of circumferentially directed jolts or their transmission between the respective pad 17 and brush 14. Similarly, the parting or dissociation of the trailing lateral edges 21 and 24, which occurs subsequently to the leading edge meeting on further rotation of the commutator member 11, but also simultaneously over the entire lengths of such edges 21 and 24 in the conventional commutator constructions, may result, albeit possibly to a lesser degree, in the application of radial and/or circumferential forces or jolts to the respective brush 14 or pad 17, and in attendant radial and/or circumferential movement of the brush 14 in question.

Now, the present invention avoids this drawback of the prior commutator designs by modifying the standard commutator arrangement 10 of FIG. 1 in a manner of which several representative but not exhaustive examples are depicted in FIGS. *2a* to *2d* of the drawing. This is achieved in accordance with the present invention, generally speaking, by configuring or arranging the pads 17 and/or the brushes 14 with respect to one another in such a way that the lateral edges 20 and 21, on the one hand, and the lateral edges 23 and 24, on the other hand, extend along respective courses that deviate from one another over at least a portion of their lengths so that, during the rotation of the shaft 12, the respective leading lateral edges, such as 20 and 23, meet each other, and the respective trailing lateral edges, such as 21 and 24 cease to contact one another, at different times at different locations along the courses thereof.

In the commutator arrangement construction depicted in FIG. *2a*, this is achieved in that the lateral edges 20 and 21 of the commutator pads 17 have rectangularly serrated configurations, while the lateral edges 23 and 24 of the depicted brush 14 extend parallel to the rotational axis of the shaft 12 over their entire lengths. Thus, the respective lateral edge 20 or 21 delimits a multitude of rectangular, as shown substantially square, protrusions, with the protrusions of the lateral edge 20 extending between the protrusions of the lateral edge 21 and vice versa. Consequently, the contact of the leading lateral edge 20 with the leading edge 23 occurs first at the leading regions of its protrusions and only some time later at the regions situated between such protrusions. It may be seen that, as a result, the total length of the portion of the leading lateral edge 20 which, at any given time, first comes into contact with the leading lateral edge 23 is significantly shorter than in the conventional commutator arrangement constructions, so that the level of noise generated as a result of such contact is also reduced accordingly. Similar considerations are also applicable to the disengagement of the trailing lateral edges 21 and 24.

In the modified construction depicted in FIG. *2b* of the drawing, the situation is similar to that described above, except that now the protrusions have triangular configurations. An additional advantage of this approach is that the contact of the leading lateral edges 20 and 23 is established, and that of the trailing lateral edges 21 and 24 is broken, in a point by point, rather than line by line, fashion, resulting in a gradual engagement or disengagement and hence in a further reduction of the overall noise level attending such engagement and/or disengagement.

Similar advantages are also encountered when, as also contemplated by the present invention, the lateral edges 20 and 21 follow curved or arcuate (such as sinusoidal, circular or scalloped) courses. It is particularly advantageous when, in each of the cases enumerated above, the circumferential extent of the respective protrusions is greater than that of the gap 18. This feature results in a situation where the brush 14 is juxtaposed with such protrusions of two adjacent ones of the pads 17 from the time that first point of the leading lateral edge 20 of the next following pad 17 meets its counterpart at the leading lateral edge 23 until the time that the last point of the trailing lateral edge 23 dissociates itself from its counterpart at the trailing lateral edge 21 of the preceding pad 17. This simultaneous juxtaposition of the brush 14 with the axially adjacent ones of the protruding portions of the circumferentially adjacent ones of the pads 17 further reduces the likelihood of noise generation due to radial and/or circumferential movement of the brush 14.

A similar concept is also present in the modified construction revealed in FIG. *2c* of the drawing. Here again, the lateral edges 23 and 24 of the respective brush 14 extend in parallelism with the axis of the shaft 12; however, the lateral edges 20 and 21 of the respective pads 17 extend, in substantial parallelism with one another, along lines that include a small acute spatial angle with the shaft axis. Here again, the leading lateral edges 20 and 23 meet, and the trailing lateral edges 21 and 24 dissociate themselves from one another, in a gradual or point by point fashion, except that this time this occurs in a one point at a time manner.

The construction depicted in FIG. *2d* of the drawing accomplishes the same result. However, this time it is the lateral edges 20 and 21 of the pads 17 that extend parallel to the shaft axis, while the lateral edges 23 and 24 of the respective brush 14 extend askew relative to such axis. Other modified constructions which are also contemplated but are not illustrated in the drawing involve the use of lateral edges 20 and 21 being skewed relative to the rotational axis in one sense while the lateral edges 23 and 24 are skewed in the opposite sense, and of the axially parallel lateral edges 20 and 21 of the pads 17 in combination and cooperation with the lateral edges 23 and 24 of the brushes 14 that are serrated in the manner discussed above, especially in conjunction with FIGS. *2a* and *2b* of the drawing. Furthermore, all of the lateral edges 20, 21, 23 and 24 would be errated, but with the serrations of the edges 20 and 21 being different from those of the edges 23 and 24. Also, the edges 20 and 21 and/or 23 and 24 could have several compatible ones of the serrations described above or other or, generally speaking, the courses of the edges 20, 21, 23 and 24 could have any desired shapes so long as they deviate from one another, as between the edges 20 and 21, on, the one hand and the edges 23 and 24, on the other hand, over a substantial portion of their respective lengths.

While the present invention has been illustrated and described as embodied in a particular construction of a commutator arrangement in which the commutator member is constructed as a ring, it will be appreciated that the present invention is not limited to this particular example; rather, the scope of protection of the present invention is to be determined solely from the attached claims.

We claim:

1. A commutator arrangement comprising a support;

a commutator member mounted on said support for rotation relative thereto about a rotational axis and including a plurality of circumferentially adjacent contact pads that are mechanically connected with one another and electrically separated from each other by respective intervening gaps, said pads having radially facing convex first contact surfaces which are centered on said rotational axis all at substantially the same radius therefrom to cumulatively constitute a circumferential surface of the commutator member that is interrupted by said gaps, and each of which is circumferentially delimited by a respective first pair of lateral edges extending along the adjacent ones of said intervening gaps; and a number of commutator brushes each having a second contact surface of a concave configuration substantially conforming to that of said first surfaces and delimited by respective second pair of lateral edges, each of said brushes being mounted on said support for only substantially radial movement relative thereto toward and away from said circumferential surface with said second contact surface facing and in area contact with said circumferential surface and said lateral edges of said second pair extending along those of said first pair, and being biased toward said circumferential surface to establish contact between said first and second contact surfaces;

wherein said lateral edges of at least one of said pairs circumferentially deviate from those of the other of said pairs and from parallelism with said rotational axis over at least a part of their courses such that different portions of each of said lateral edges of said second pair are juxtaposed with the corresponding portions of the respective lateral edge of said first pair at different times during the relative rotation of said commutator member.

2. The arrangement as defined in claim 1, wherein said lateral edges of said other pair are situated in their entirety in respective planes that extend in substantial parallelism with one another and with said rotational axis.

3. The arrangement as defined in claim 2, wherein said lateral edges of said one pair extend in their entirety in respective directions each of which includes a predetermined small acute spatial angle with said rotational axis.

4. The arrangement as defined in claim 2, wherein said courses of said lateral edges of said one pair exhibit a plurality of separate circumferentially oriented protrusions.

5. The arrangement as defined in claim 4, wherein said protrusions have rectangular configurations.

6. The arrangement as defined in claim 4, wherein said protrusions have triangular configurations.

7. The arrangement as defined in claim 4, wherein said one pair is said first pair; and wherein said protrusions of one of said lateral edges of each one of said pads extend between those of that of said lateral edges of the respective circumferentially adjacent pad that is situated closer to said one pad to such an extent that said second contact surface of the respective brush is always in area contact with said interrupted circumferential surface of said commutator member.

8. The arrangement as defined in claim 1, wherein the extent of the deviation of said first and second lateral edge pairs is such that said second contact surface of the respective brush is always in area contact with said interrupted circumferential surface of said commutator member.

9. A commutator member to be mounted when in use on a support for rotation about a rotational axis relative thereto and to be used in conjunction with a plurality of commutator brushes each having a concave contact surface delimited by lateral edges that extend parallel to the rotational axis, and being mounted on the support for only substantially radial movement relative thereto toward and away from, and being biased toward, the commutator member with the brush contact surface facing the latter, comprising a plurality of circumferentially adjacent contact pads that are mechanically connected with one another and electrically separated from each other by respective intervening gaps, said pads having radially outwardly facing convex contact surfaces which substantially conform to the configurations of the concave contact surfaces of the commutator brushes and are centered on said rotational axis all at substantially the same radius therefrom to be in area contact with the contact surfaces of the commutator brushes and to cumulatively constitute a circumferential surface of the commutator member that is interrupted by said gaps, and each of which is circumferentially delimited by lateral edges extending along the adjacent ones of said intervening gaps along courses that at least partially circumferentially deviate from parallelism with the rotational axis such that different portions of each of said lateral edges of the respective brush are juxtaposed with the corresponding portions of the respective lateral edge of the respective pad at different times during the relative rotation of said commutator member.

10. The commutator member as defined in claim 9, wherein said lateral edges of said pads extend in their entirety in respective directions each of which includes a predetermined small acute angle with said rotational axis.

11. The commutator member as defined in claim 9, wherein said courses of said lateral edges of said pads exhibit a plurality of separate circumferentially oriented protrusions.

12. The commutator member as defined in claim 11, wherein said protrusions have rectangular configurations.

13. The commutator member as defined in claim 11, wherein said protrusions have triangular configurations.

14. The commutator member as defined in claim 11, wherein said protrusions of one of said lateral edges of each of said pads extend between those of that of said lateral edges of the respective circumferentially adjacent pad that is situated closer to said one pad to such an extent that the contact surface of the respective brush is always in area contact with said interrupted circumferential surface of said commutator member.

15. The arrangement as defined in claim 9, wherein the extent of the deviation of said lateral edges of said pads is such that the contact surface of the respective brush is always in area contact with said interrupted circumferential surface of said commutator member.

* * * * *